United States Patent [19]

McNealy et al.

[11] 4,418,258
[45] Nov. 29, 1983

[54] METHOD FOR HEAT TREATING METAL

[75] Inventors: Richard C. McNealy; Charles F. Cravens, both of Duncan, Okla.

[73] Assignee: Halliburton Company, Duncan, Okla.

[21] Appl. No.: 348,119

[22] Filed: Feb. 11, 1982

Related U.S. Application Data

[62] Division of Ser. No. 166,739, Jul. 7, 1980, abandoned.

[51] Int. Cl.³ .......................... H05B 6/38; H05B 6/44
[52] U.S. Cl. .................................. 219/10.41; 219/8.5; 219/10.57; 219/10.79; 148/154; 266/129
[58] Field of Search ................... 219/10.41, 10.43, 8.5, 219/9.5, 10.49 R, 10.79, 10.71, 10.69, 10.57, 10.75, 10.77; 148/150, 154, 128, 127; 266/129

[56] References Cited

U.S. PATENT DOCUMENTS

| | | | |
|---|---|---|---|
| 2,180,513 | 11/1939 | Fugill et al. | 219/10.77 X |
| 2,368,809 | 2/1945 | Denneen et al. | 219/10.43 X |
| 2,632,079 | 3/1953 | Body | 219/9.5 X |
| 2,762,892 | 9/1956 | Park | 219/10.43 X |
| 3,504,149 | 3/1970 | Dixon et al. | 219/9.5 |
| 3,737,613 | 6/1973 | Gillock | 219/10.43 X |
| 4,188,419 | 2/1980 | Detert et al. | 148/127 |

Primary Examiner—Roy N. Envall, Jr.
Assistant Examiner—Philip H. Leung
Attorney, Agent, or Firm—Joseph A. Walkowski; Thomas R. Weaver

[57] ABSTRACT

A method for relieving stress in the microstructure welds and the heat affected zone in the adjacent base metal in low alloy steel by induction heating in a second post-weld heat treatment. The heated area is monitored with a radiation pyrometer to ensure precise temperature control of the procedure.

3 Claims, 3 Drawing Figures

METHOD FOR HEAT TREATING METAL

This is a division of application Ser. No. 166,739, filed July 7, 1980, now abandoned.

BACKGROUND OF THE INVENTION

The present invention relates to relieving stress in the microstructure of metal by induction heating, and more particularly to the stress-relief of welds and surrounding areas of base metal in low alloying steels employed in hostile subsurface environments such as are encountered in the petroleum industry.

In many areas of the world, hydrogen sulfide, commonly called "sour gas" is encountered where a petroleum well is drilled. The presence of sour gas in a well dictates a choice of materials which will not be subject to sulfide stress cracking, which may be described as the brittle failure of a metal under the combined action of tensile stress and corrosion in the presence of hydrogen sulfide in an aqueous environment.

The National Association of Corrosion Engineers (NACE) has published a Material Requirement dealing with "Sulfide Stress Cracking Resistant Metallic Material For Oil Field Equipment," NACE Standard MR-01-75 (1980 Revision), which standard is employed as a materials guideline by the petroleum industry when dealing with sour gas. The standard sets forth various requirements for the acceptable performance in sour gas of different ferrous and non-ferrous metals, fabrication, bolting, platings and coatings thereof, as well as requirements for various specific components and devices used in well drilling, testing, production and servicing. Low alloy steels, being those containing less than about five percent (5%) total alloying elements, are acceptable materials for a sour gas environment provided they meet certain requirements set forth in NACE Standard MR-01-75.

In general, if these steels contain less than one percent (1%) nickel (Ni), they are acceptable provided they are subjected to certain thermal treatments to alter the microstructure of the steel. It is emphasized by the NACE Standard that there is a definite correlation between sulfide stress cracking, heat treatment and hardness in metals, which correlation has been proven by extensive laboratory and field data. Hardness is in part a function of the stress present in the microstructure; the resistance of the metal to sulfide stress cracking is enhanced by the lowering of hardness by stress relief in the microstructure through heat treatment. As hardness is an accurate, nondestructively generated test parameter, it is extensively used to monitor materials performance. The Rockwell "C" Hardness Scale (HRC) as used in the NACE Standard is the primary basis for determination of an acceptable hardness, for sour gas equipment, although it should be understood that other hardness scales may be employed using suitable conversion factors for correlation purposes. As a rule, a hardness of HRC 22 is the maximum hardness allowable by NACE for low-alloy steels and welds thereon in a sour gas environment. A hardness of up to HRC 26 may be tolerated for certain tubular goods, but only if adequate performance is verified with a sulfide stress cracking test, a procedure necessitating additional expense. Therefore, it is desirable to obtain a hardness of HRC 22, it being understood that this figure may be the average of several tests, as long as the maximum HRC of a specimen does not exceed 23 or 24.

In many instances, a hardness of HRC 22 maximum for steel and welds thereon can be obtained by heat treating the material or apparatus in question in a furnace, but in other instances this is impractical, such as where the apparatus is assembled and then welded, the assembly including components such as elastomeric seals, which are destroyed by the high furnace temperatures. Likewise, even in the absence of seals, there may be finished surfaces in the apparatus which would be damaged by prolonged exposure to high temperatures necessitated by furnace treatment. Thus, there presently exists a problem in the production of some material or assembly of apparatus to the NACE Standard.

SUMMARY OF THE INVENTION

The present invention comprises a method for thermally treating low alloy steel and welds thereon using electrical induction heating, which heating is monitored using a radiation pyrometer or other suitable means, the induction heating being applied only to the specific area to be stress relieved in a second post-weld heat treatment at a temperature approaching the critical point of the treated material for a relatively brief period of time. By employing such a method, seals and other destructible nonmetallic elements as well as finished surfaces in relatively close proximity to the heat treated areas are permitted to remain at a low enough temperature to ensure their integrity.

BRIEF DESCRIPTION OF THE DRAWINGS

The present invention will be more readily understood with reference to the description hereafter set forth, in conjunction with the accompanying drawings wherein.

DESCRIPTION OF THE PREFERRED EMBODIMENT

Stress-relief of microstructures in metals by heating in a furnace is common in many industries. Generally, the heating takes place over a relatively long period of time, measured in hours. Induction heating, on the other hand, is usually effected in minutes or seconds. Certain variables result in different times and temperatures for obtaining equivalent results from the two types of heating, the relationship of which has been expressed in the following equation:

$$T_I(C+\log t_I) = T_F(C+\log t_F)$$

where $T_F$ and $t_F$ are the furnace temperature (in degrees Rankine) and time, respectively, known to produce a given hardness in a metal, and $T_I$ and $t_I$ are the equivalent temperature (in degree Rankine) and time needed to produce that hardness with induction heating. C is a constant which may be empirically determined for a given metal, and is approximately 15 for steels with 0.25 to 0.50% carbon content. The figures obtained from the above equation for time and temperature to be employed in induction heating of a specific metal are, of course, further refined by empirical testing.

Figure 1:
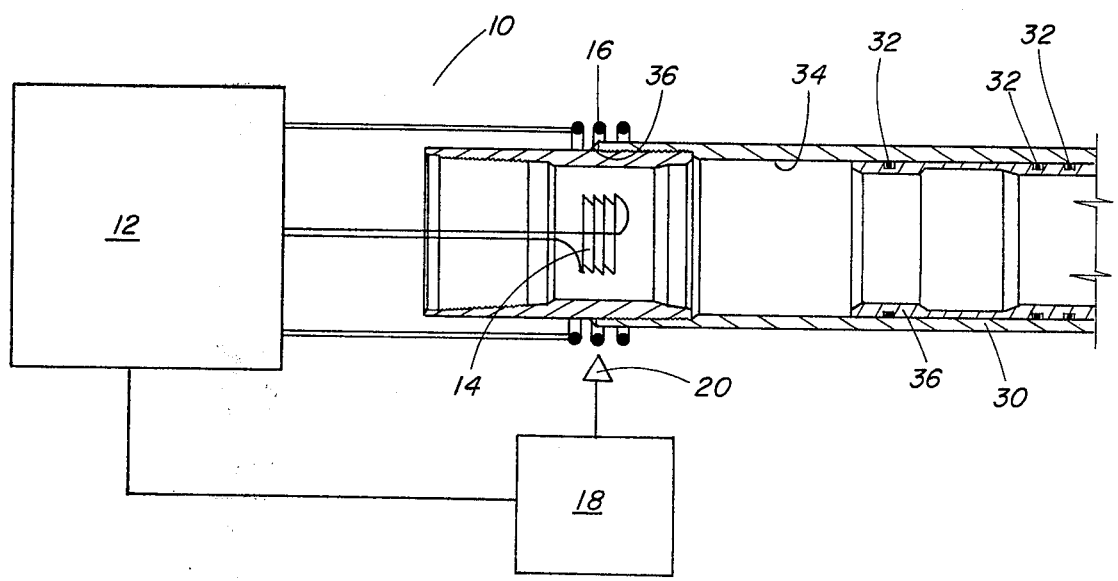
FIG. 1 is a schematic of an apparatus employed in the practice of the present method, with an apparatus to be heat treated oriented in position.

FIG. 1 schematically depicts an induction heating apparatus designated generally at 10. Induction heating apparatus 10 comprises generator and load coil transformer 12, to which inner induction coils 14 and outer induction coils 16 are connected. A suitable generator is a Lepel 100 kw generator, Model T-100-3kcTL. Precise temperature control at the workpiece 30 is achieved by use of radiation pyrometer/three mode proportional controller 18, which controls the generator, varying the output thereof in response to the input of infrared sensor 20, which senses the temperature on the workpiece 30. A suitable pyrometer/controller is the IRCON, model 6-22F15-01-000-1/620. A portion of tubular workpiece 30 is shown disposed between the inner induction coils 14 and the outer induction coils 16. The two coils are employed to avoid a temperature gradient in the workpiece 30, and further temperature uniformity is achieved by mounting the workpiece 30 on a rotating jig (not shown), whereby the workpiece 30 is rotated about its longitudinal axis during the induction heating procedure.

For the sake of illustration, and not by way of limitation, the workpiece 30 shown is a portion of a Halliburton Services F. O. Multiple Stage Cementer, described on page 3347 of Halliburton Service Sales and Service Catalog Number 40. This type of workpiece poses several impediments to furnace stress-relief, namely the presence of elastomeric seals 32 and of finished surface 34. Fusion weld 36 is to be stress-relieved with no damage to surface 34 or elastomeric seals 32.

The F. O. Multiple Stage Cementer comprises metallic parts of AISI (American Iron and Steel Institute) Grade 4140 low alloy steel. The elastomeric seals 32 have a maximum temperature destruction tolerance of 325° F. Finished surface 34 will begin to scale at 1050° F. As it is necessary for the operation of the F. O. Multiple Stage Cementer that sleeve 36 slide within finished surface 34, scaling on surface 34 may result in an inoperative tool. If there were no seals or finished surfaces, the workpiece could be stress-relieved by furnace heating for a prolonged period at 1300° F. However, as the assembled Cementer does include these items, a furnace treatment is impossible. The following procedure, unlike a furnace heat treatment, will result in an assembly and welds thereon with the desired hardness characteristics.

Prior to assembly, the metallic parts of the F. O. Multiple Stage Cementer, comprising fine grain seamless, hot finished and normalized AISI Grade 4140 low alloy steel, are subjected to stress-relief heating in a furnace at 1300° F. for several hours. Subsequently, the desired finished surface 34 is machined, and the tool is assembled with elastomeric seals 32. At that point, fusion weld 36 is made by, for example, a submerged arc welding process (SAW), with a preheat at the weld point of 700° F., an interpass temperature of 650° F. during the welding process, followed by cooling to below the $M_s$ temperature, the temperature of which martensite begins to form, which is approximately 500° F. The interpass temperature lowers the cooling rate of the metal to an acceptable level, minimizing residual stresses in the microstructure. Subsequently, the weld is subjected to a first postheat at 800° F. A low alloy steel electrode comprising less than 1% nickel (Ni) is employed in the SAW process, being an ASME (American Society of Mechanical Engineers) SF A5.28 ER80S-D2. Such electrodes are available from Union Carbine Corporation Linde Division as Linde 83, or Page Division of Acco as Page 18. The weld flux employed may be a neutral Fxxx, classes per AWS (American Welding Society) A5.17-76 or A5.23-77. A suitable flux is Lincoln Electric 880 Flux.

Subsequent to the first postheat, the workpiece 30 is cooled and placed on a jig, which orients the workpiece 30 between inner induction coils 14 and outer induction coils 16 of induction heating apparatus 10. The workpiece 30 is slowly rotated on the jig about its axis between the two coils during which rotation the weld 36 is then subjected to a second postheat at substantially 1340° F. for 900 seconds. The temperature is measured by sensor 20 at the metal surface of the workpiece 30. Radiation pyrometer/three mode proportional controller 18 maintains this temperature in an accurate manner by controlling the output of generator and load coil transformer 12 to induction coils 14 and 16. As 1340 F. is close to the critical temperature of 1354° F. for AISI Grade 4140 low alloy steel, it is imperative that the stress-relief temperature be closely monitored to avoid a supercritical temperature in the metal.

Actual empirical testing of AISI Grade 4140 specimens welded and subjected to a second postheat according to these specifications has shown the hardness of the heat-affected zone (HAZ) in the base metal adjacent the weld to under HRC 23 after stress-relief. Test specimens were stressed to 100% of their transverse tensile yield strength, with the maximum stress located across the fusion zone of the weld, and subjected to a 5% sour brine corrodent at atmospheric pressure at 65° F. temperature for 30 days. All specimens resisted sulfide stress cracking for the 30 day period.

Figure 2:
FIG. 2 is a drawing depicting the microstructure of the heat affected zone of the base metal adjacent a fusion weld, such as could be found on the apparatus to be treated in FIG. 1, prior to heat treatment.
Figure 3:
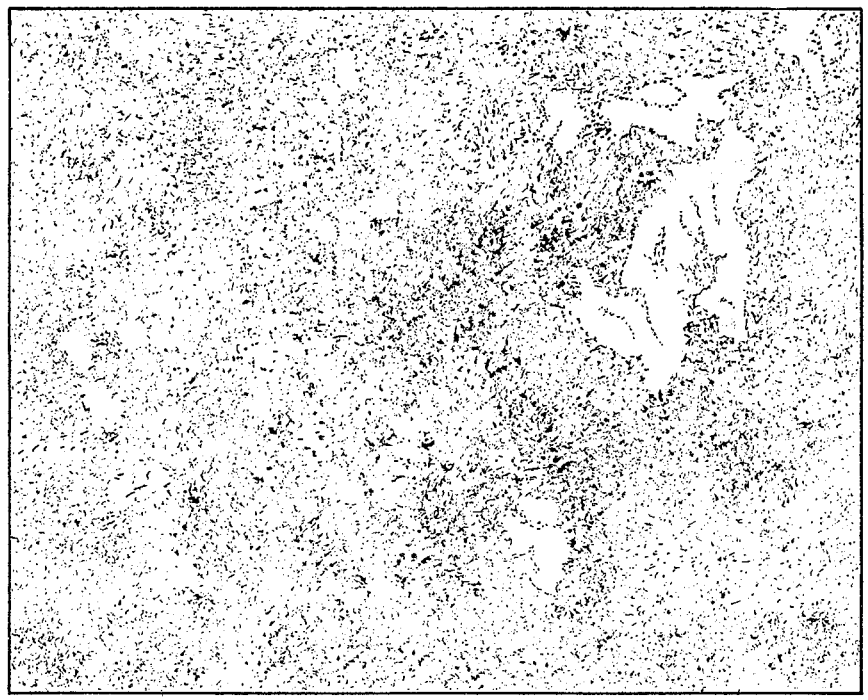
FIG. 3 is a drawing depicting the microstructure of the heat affected zone of FIG. 2 after heat treatment by the method of the present invention.

Refering to FIGS. 2 and 3 of the drawings, which are representative of the microstructure of the HAZ of base metal adjacent a weld at 200× magnification on an F. O. Multiple Stage Cementer, it can be seen in FIG. 2 that there was a moderately stressed microstructure in the HAZ after the first post-weld heating, comprising martensite as well as bainite, the latter of which appears as groups of needle-like structures. FIG. 3, depicting the HAZ adjacent the weldment after the second postheat, shows a much more refined grain structure in the HAZ, with attendant lowered stress level. The HAZ hardness was reduced from HRC 29 measured in FIG. 2, to HRC 20 measured in FIG. 3. During the stress relief-process, the maximum temperature at 9.5 inches from the weld along the outer case of the F. O. Multiple Stage Cementer was 295° F., below the destruction temperature of the elastomeric seals 32, and well below scaling temperature for finished surface 34.

It should be noted that the preheat employed in the SAW process contributes to the success of the subsequent second postheat as it enhances the formation of bainite (designated as B in FIG. 2) along with the martensite of the microstructure, thus reducing the initial hardness of the HAZ.

It may also be noted that the temperatures and times given in the above illustration are variable to a certain extent for the desired results. For example (again assuming AISI Grade 4140 low alloy steel), a preheat as low as substantially 675° F. or as high as substantially 800° F. may be employed, with acceptable results. The higher preheat temperature of 800° F. will result in less martensite formation and a softer post-weld microstructure, but the lower temperatures will produce acceptable results. Likewise, a first postheat of substantially 775° F. to substantially 900° F. may be utilized. The first postheating is the least critical of the heating steps, being used to drive off monatonic hydrogen from the weldment. Similarly, the interpass temperature of 650° F. is an approximation, the important consideration being the reduction of the cooling rate at the weld area to an acceptable area.

It should also be understood that the critical temperature given for AISI Grade 4140 low alloy steel may vary appreciably from 1354° F., depending upon the exact chemical composition of the bar stock obtained. The critical temperature may range from 1340° F. to 1395° F., thus allowing some minor variation of the induction heating postheat temperature. For example, a minimum time of 350 seconds at substantially 1335° F. may be employed, and acceptable results obtained. The second postheat temperature of 1340° F. may also be modified downward somewhat, for example to substantially 1310° F., for a time of substantially 900 seconds. Below this temperature, the time for heating becomes too long from an economic standpoint. Furthermore, it is desirable to maintain hardness in the range of HRC 18–22, to preserve the mechanical properties of the weld material and surrounding base metal in the HAZ, which too long a heating time may prevent. Equipment used in sour gas in the petroleum industry must meet the API (American Petroleum Institute) L-80 tensile requirements, as well as the L-80 hardness requirement of HRC 23 maximum. The minimum acceptable tensile yield strength is 80,000 psi. Reduction of hardness to below substantially 18 HRC will result in failure to meet this requirement. While it may not be necessary for the weldment itself to meet this requirement, if the hardness in the HAZ is reduced below substantially 18 HRC, the base metal in the HAZ will fail at too low a stress.

It should also be noted that the use of temperatures in the second postheat below substantially 1310° F. in the instances where seals, finished surfaces or other destructible elements are present, may result in damage to those elements due to the necessarily longer time exposure at what must still be a high temperature, to achieve the desired results.

While reference has been made to the specific example of treating AISI Grade 4140 low alloy steel, it should be understood that the present invention is not so limited. Other low alloy steels, as well as some carbon steels, are susceptible to treatment in a similar fashion.

It is thus apparent that the present invention comprises a new and different method for heat treating metals which will be subject to a sour gas environment when furnace heating is unworkable. Additionally, the procedure may be accomplished in a very short period of time, with high quality control and uniformity. The method, of course, while illustrated with respect to welds and surrounding HAZ in base metal, is not so limited; rather it is applicable wherever precise, localized heat treating to relieve stress in the microstructure of metals is desired. It will be readily apparent to one of ordinary skill in the art that modifications, additions, and substitutions to the disclosed method can be made, the invention being limited only by the spirit and scope of the appended claims.

We claim:

1. The method of induction heating a tubular workpiece to effect a heat treatment of an annular portion thereof, comprising:

positioning said tubular workpiece with said annular portion substantially coaxially disposed between inner and outer induction coils;

rotating said tubular workpiece about its longitudinal axis while said coils are energized to heat said annular portion;

sensing the temperature in said annular portion with an infrared sensor associated with a radiation pyrometer during said rotation of said workpiece; and controlling the output of said coils in response to the output of said radiation pyrometer, whereby said annular portion is heated to and maintained at a selected temperature level in a substantially uniform manner.

2. The method of claim 1, wherein said annular portion of said workpiece includes a weld and surrounding heat affected zone of base metal.

3. The method of claim 2, wherein said selected temperature level is below the critical temperature of said base metal.

* * * * *